(12) United States Patent
Holmes

(10) Patent No.: US 7,137,919 B2
(45) Date of Patent: Nov. 21, 2006

(54) PLANETARY DUAL POWER PATH TRANSMISSION WITH ELECTRIC MOTORS

(75) Inventor: Alan G. Holmes, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 188 days.

(21) Appl. No.: 10/992,529

(22) Filed: Nov. 18, 2004

(65) Prior Publication Data

US 2006/0105876 A1    May 18, 2006

(51) Int. Cl.
*F16H 37/06* (2006.01)
(52) U.S. Cl. .......................................... 475/5; 475/298
(58) Field of Classification Search ............... 475/298, 475/299, 300, 286, 5
See application file for complete search history.

(56) References Cited

U.S. PATENT DOCUMENTS

| | | | | |
|---|---|---|---|---|
| 4,531,428 A | * | 7/1985 | Windish | 475/279 |
| 5,730,676 A | * | 3/1998 | Schmidt | 475/5 |
| 6,540,631 B1 | * | 4/2003 | Holmes | 475/5 |
| 6,945,894 B1 | * | 9/2005 | Holmes | 475/5 |
| 6,953,409 B1 | * | 10/2005 | Schmidt et al. | 475/5 |
| 2003/0078126 A1 | * | 4/2003 | Holmes et al. | 475/5 |
| 2005/0252703 A1 | * | 11/2005 | Schmidt et al. | 180/65.2 |

* cited by examiner

*Primary Examiner*—Tisha Lewis
*Assistant Examiner*—Justin K. Holmes
(74) *Attorney, Agent, or Firm*—Christopher DeVries

(57) ABSTRACT

A dual path planetary transmission includes two planetary gearsets each having a sun gear member, a ring gear member, and a planet carrier assembly member. Each of the members of the planetary gearsets are selectively connectible between an input shaft, an output drive mechanism, and a stationary member. Each of the planetary gearsets is effective to provide a reverse ratio and five forward gear ratios. The output mechanism of each of the planetary gearsets includes a different gear ratio between the output mechanism and the transmission output shaft.

9 Claims, 6 Drawing Sheets

PLANETARY DUAL POWER PATH TRANSMISSION WITH ELECTRIC MOTORS

TECHNICAL FIELD

This invention relates to power transmissions and, more particularly, to dual path power transmissions.

BACKGROUND OF THE INVENTION

Dual path power transmissions have been suggested for a number of years. Initially, the dual path power transmissions were countershaft-type transmissions having two input clutches and separate countershafts having gears meshing with gears on a main or output shaft. The speed ratios through the transmission were alternated between one input clutch that transmitted engine torque to one of the countershafts and a second input clutch transmitting engine torque to another of the countershafts. The countershaft not currently transmitting torque could have the gear ratio thereon preselected for the next on-coming ratio, whether it be an upshift or a downshift. Likewise, when that ratio interchange had been accomplished, the first countershaft or the outgoing gear ratio countershaft would be preselected to the next oncoming ratio. The swapping of ratios for the ratio interchange is accomplished by the alternate action of the dual input clutches.

It has also been suggested to employ planetary transmissions in dual input clutch power transmissions. In dual input planetary transmissions, an input clutch is connected to a first planetary gearset either through a synchronizer or directly to one member. The reaction and output members are controlled by synchronizers, which complete the gear ratio or speed ratio through the individual gearsets. These dual input planetary-type transmissions employing synchronizers do not make use of the full range of ratios that are available in these planetary gearsets.

SUMMARY OF THE INVENTION

It is an object of the present invention to provide an improved dual power path planetary transmission.

In one aspect of the present invention, two substantially identical planetary gearsets are employed.

In another aspect of the present invention, each of the planetary gearsets is axially movable to provide spline engagements between the planetary gear members and one of an input shaft, an output mechanism, or a reaction member. The output mechanism of each gearset includes a selectively engageable clutch, which completes a gear ratio with the transmission output shaft.

In yet another aspect of the present invention, each of the output mechanisms has incorporated therein an electric motor/generator, which can assist in providing power to the output shaft and/or absorbing power from the output shaft during engine braking or during normal operation.

DESCRIPTION OF THE EXEMPLARY EMBODIMENTS

Figure 1:
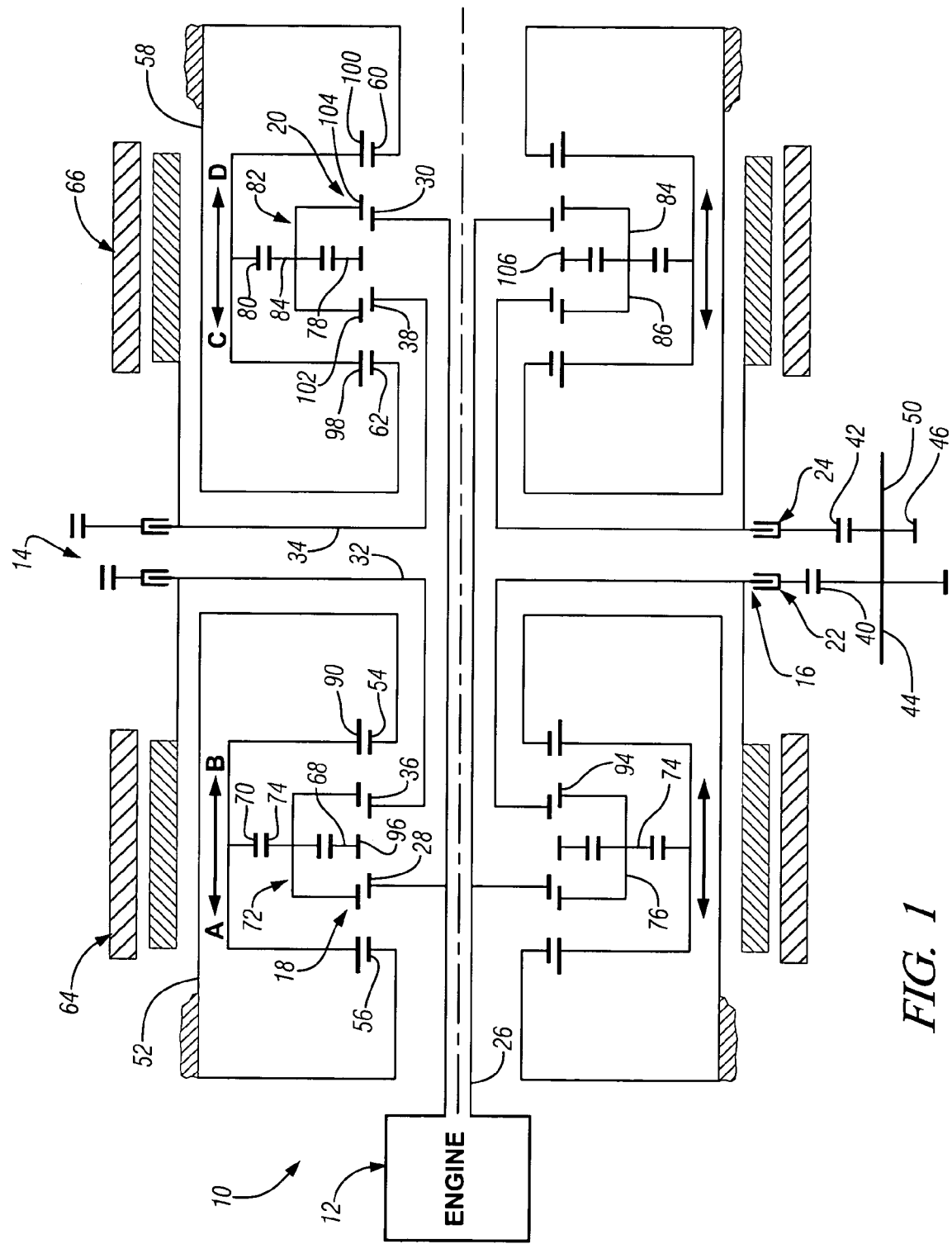
FIG. 1 is a schematic representation of a powertrain incorporating the present invention.

Referring to the drawings, wherein like characters represent the same or corresponding parts throughout the several views, there is seen in FIG. 1 a powertrain, generally designated 10, including an engine 12, a planetary gear arrangement 14, and an output mechanism 16.

The planetary gear arrangement 14 includes two planetary gearsets 18 and 20 and the output mechanism includes two selectively engageable clutches 22 and 24. The engine 12 is drivingly connected with a transmission input shaft 26, which has incorporated thereon a spline mechanism 28 and 30.

The output mechanism 16 includes two output hub members 32 and 34, which have respective spline portions 36 and 38. The output hub 32 is operatively connected with the clutch 22 and the output hub 34 is operatively or drivingly connected with the clutch 24.

The clutch 22 has drivingly connected therewith an output gear 40 and the clutch 24 has associated therewith an output gear 42. The output gear 40 meshes with an output gear 44 and the output gear 42 meshes with an output gear 46. The gears 44 and 46 are drivingly connected with transmission output shafts 48 and 50.

A stationary housing or member 52 surrounds the planetary gearset 18. The stationary member 52 includes a pair of splined portions 54 and 56. A stationary housing or member 58 surrounds the planetary gearset 20 and has incorporated therewith a pair of splined portions 60 and 62.

The output hub 32 has drivingly connected therewith a motor/generator 64 and the output hub 34 has drivingly connected therewith a motor/generator 66. The motor/generators 64 and 66 are conventional electric motor/generator components, which, as is well known, can supply power or absorb power. These motor/generators are controlled by a conventional electronic control mechanism, which might include a preprogrammable digital computer, not shown.

The motor/generator 64 is capable of driving the output gear 40 when the clutch 22 is engaged, and the motor/generator 66 is capable of driving the output gear 42 when the clutch 24 is engaged. Likewise, the motor/generator 64 can absorb power from the output shaft 50 when the clutch 22 is engaged, and the motor/generator 66 can absorb power from the output shaft 50 when the clutch 24 is engaged.

The planetary gearset 18 includes a sun gear member 68, a ring gear member 70, and a planet carrier assembly member 72. The planet carrier assembly member 72 includes a plurality of pinion gears 74 that are rotatably mounted on a planet carrier member or cage 76 and disposed in meshing relationship with both the sun gear member 68 and the ring gear member 70. The planetary gearset 18 is movable axially as a unit in the directions indicated by Arrows A and B.

The planetary gearset 20 includes a sun gear member 78, a ring gear member 80, and a planet carrier assembly member 82. The planet carrier assembly member 82 includes a plurality of pinion gears 84 that are rotatably mounted on a planet carrier member 86 and disposed in meshing relationship with both the sun gear member 78 and the ring gear member 80. The planetary gearset 20 is movable axially as a unit in the direction of Arrows C and D.

In the position shown in FIG. 1, both of the planetary gearsets 18 and 20 are in a neutral condition since the sun gear members 68 and 78 are not connected to any of the splined portions associated with the input shaft 26, the output hubs 32 and 34, and the stationary housings 52 and 58. Each of the planetary gearsets 18 and 20 is capable of five forward gear ratios and a reverse gear ratio. The planetary gearsets 18 and 20, in the preferred embodiment, are substantially identical in gear tooth members as will be put forth later. Each of the planetary gearsets may be controlled to provide a reverse speed ratio, two underdrive forward speed ratios, a direct drive ratio, and two forward overdrive speed ratios. A reverse overdrive ratio is not employed with this embodiment.

The output mechanism 16 has two gear ratios between the output hubs 32, 34, and the output shaft 50. With the planetary gearset 18 employed and the clutch 22 engaged, a first gear ratio is provided between the gears 40 and 44. With the clutch 24 engaged, the gears 42 and 46 provide a gear ratio between the planetary gearset 20 and the output shaft 50.

Figure 2:
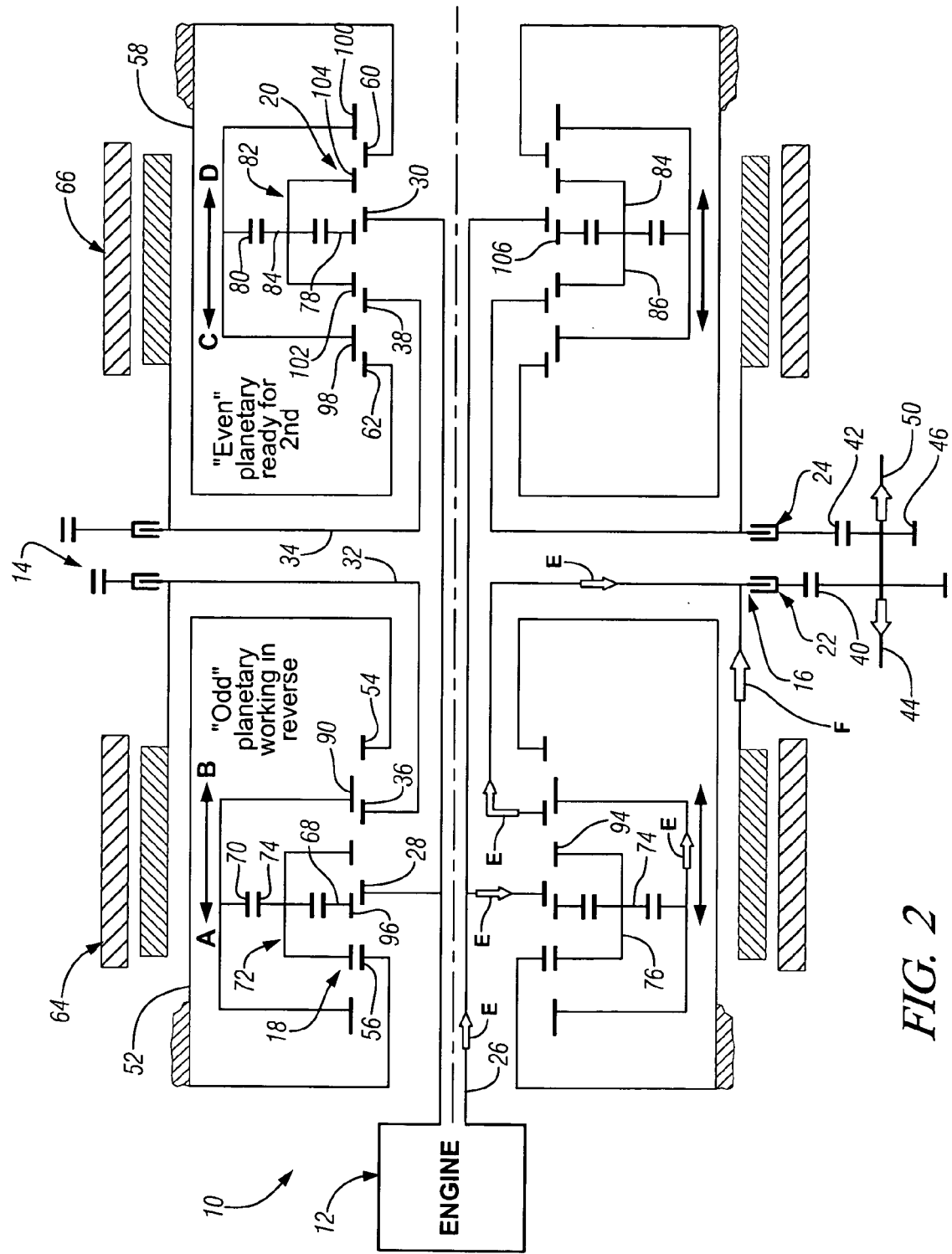
FIG. 2 is a schematic representation similar to FIG. 1 showing the powertrain in a reverse ratio condition.

As shown in FIG. 2, the ring gear member 70 has two splined portions 88 and 90, the planet carrier member 76 has two splined portions 92 and 94, and the sun gear member 68 has a splined portion 96. The ring gear member 80 has two splined portions 98 and 100, the planet carrier member 86 has two splined portions 102 and 104, and the sun gear member 78 has a splined portion 106.

In FIG. 2, the powertrain 10 is shown conditioned for reverse drive through the planetary gearset 18. When conditioned for reverse drive, the planetary gearset 18 has been moved axially in the direction of Arrow A such that the sun gear spline 96 engages the spline 28, the ring gear spline 90 engages the spline 36, and the carrier spline 92 engages the spline 56. In this condition, the sun gear member 68 is driven by the input shaft 26, the ring gear member 70 drives the output hub 32 and the carrier member 76 is held stationary. This is a conventional reverse in a planetary gearset.

During the reverse operation through planetary gearset 18, the clutch 22 is engaged thus the output drive is through the gears 40 and 44 to the output shaft 50.

During the reverse operation, the power path follows the Arrows E through the planetary gearset 18. Also during reverse, if desired, the motor/generator 64 can be powered to provide a drive as indicated by Arrow F through the output hub 32 to assist in driving the vehicle. The power output of the motor/generator 64 will be added to the power at the hub 32 from the engine 12.

Figure 3:
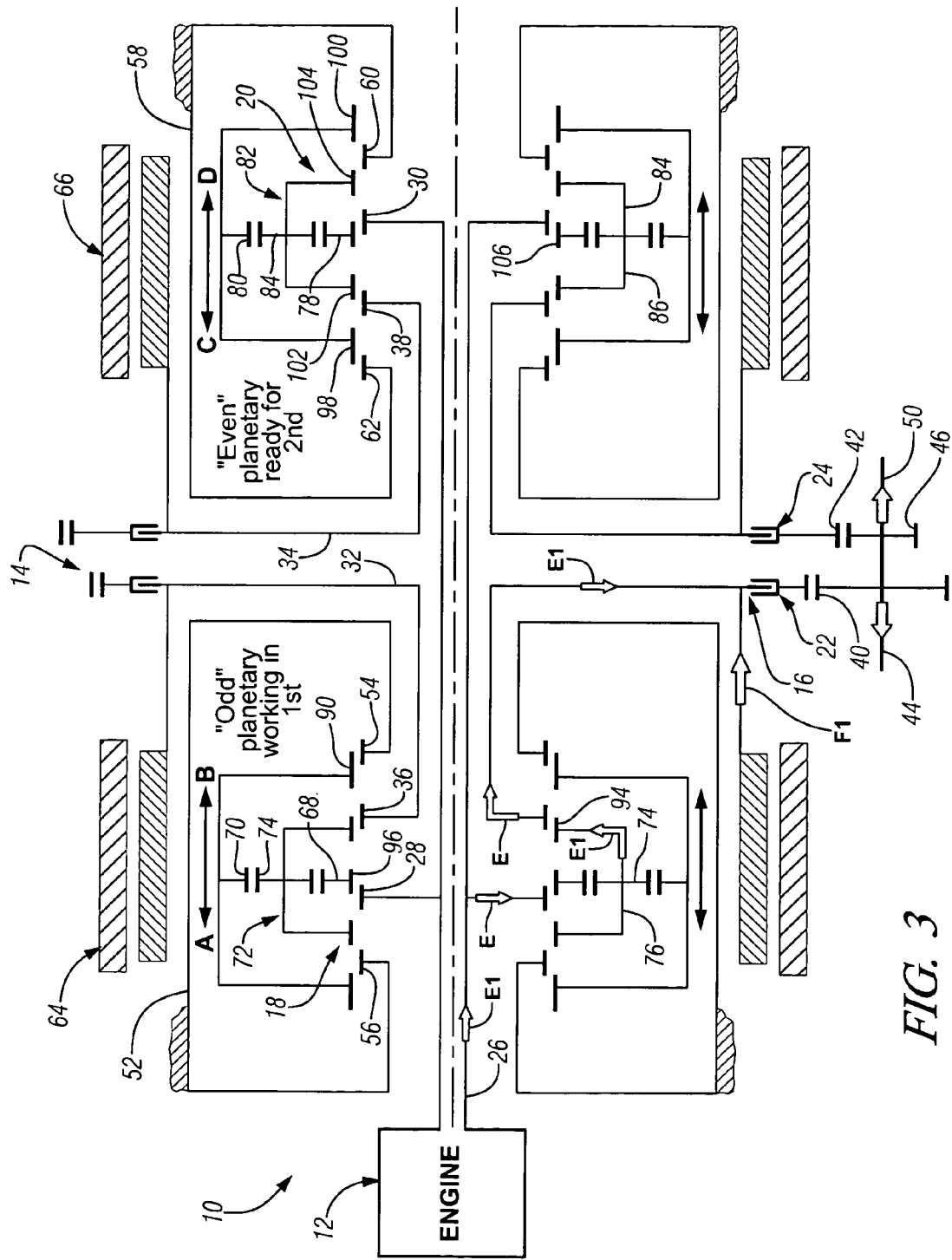
FIG. 3 is a schematic representation similar to FIG. 1 showing the powertrain in a first ratio condition.

The powertrain 10, as seen in FIG. 3, is conditioned for the first forward speed ratio. During this condition, the spline 28 engages the spline 96, the spline 36 engages the spline 94, and the spline 90 engages the spline 54. As seen in the Arrows E1, the power path is through the planetary gearset 18, which is conditioned for a reduction drive since the sun gear 68 is the input member, the ring gear 70 is the reaction member, and the planet carrier member 76 is output member. Again, as with the powertrain condition shown in FIG. 2, the electric motor/generator 64 can be conditioned to supply power in the direction of Arrow F1 thereby adding to the power flow to the output shaft 50.

Figure 4:
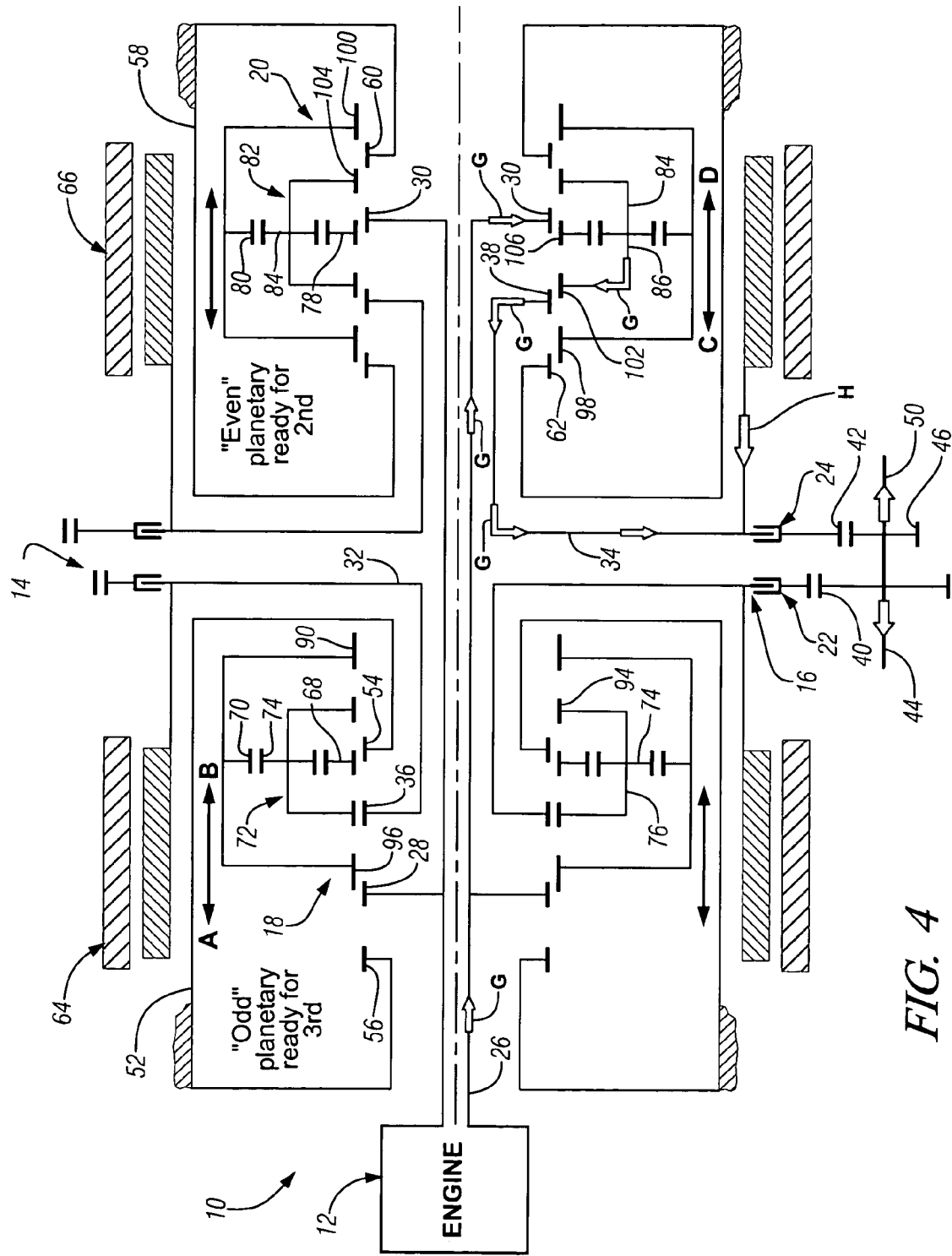
FIG. 4 is a schematic representation similar to FIG. 1 describing the powertrain in a second ratio condition.

The powertrain 10, as seen in FIG. 4, is conditioned to provide the second forward speed ratio through the planetary gearset 20. During the second forward speed ratio, the sun gear member 78 is connected with the input shaft 26 through the splines 30 and 106, the planet carrier member 86 is connected through the splines 102 and 38 with the output hub 34, and the ring gear member 80 is connected with the stationary member 58 through the splines 98 and 62. In this condition, the planetary gearset 20 has been shifted in the direction of Arrow D.

It can be noted from FIG. 3 that this condition of the second forward speed ratio was preselected while the vehicle was operating in first ratio. In the interchange from the first ratio to the second ratio, the clutch 22 is disengaged and the clutch 24 is engaged. During the second ratio, the output power from the engine 12 through hub 34 is delivered through the gears 42 and 46 to the output shaft 50. The power flow path is indicated by the Arrows G, shown in FIG. 4. It should be noted that the power flow path is from the input shaft 26 to the sun gear member 78, to the planet carrier member 86, and from there to the hub 34. As with the reverse and first operation, the motor/generator 66 can be powered to supply power in the direction of Arrow H, which is additive to the power supplied by the engine 12.

It should be noted that during second ratio operation, the planetary gearset 18 is conditioned for the third forward ratio by moving the planetary gearset 18 in the direction Arrow B. It is noted that under this condition, the spline 88 connects with the spline 28, the spline 92 connects with the spline 86, and the spline 96 connects with the spline 36. Third gear operation is another underdrive ratio with the ring gear member 70 being the input, the planet carrier member 76 being the output, and the sun gear member 68 being the reaction. Arrows for this power flow are not shown. It should also be appreciated that the planetary gearset 18 could be conditioned for first ratio operation should a downshift from second to first be anticipated.

Figure 5:
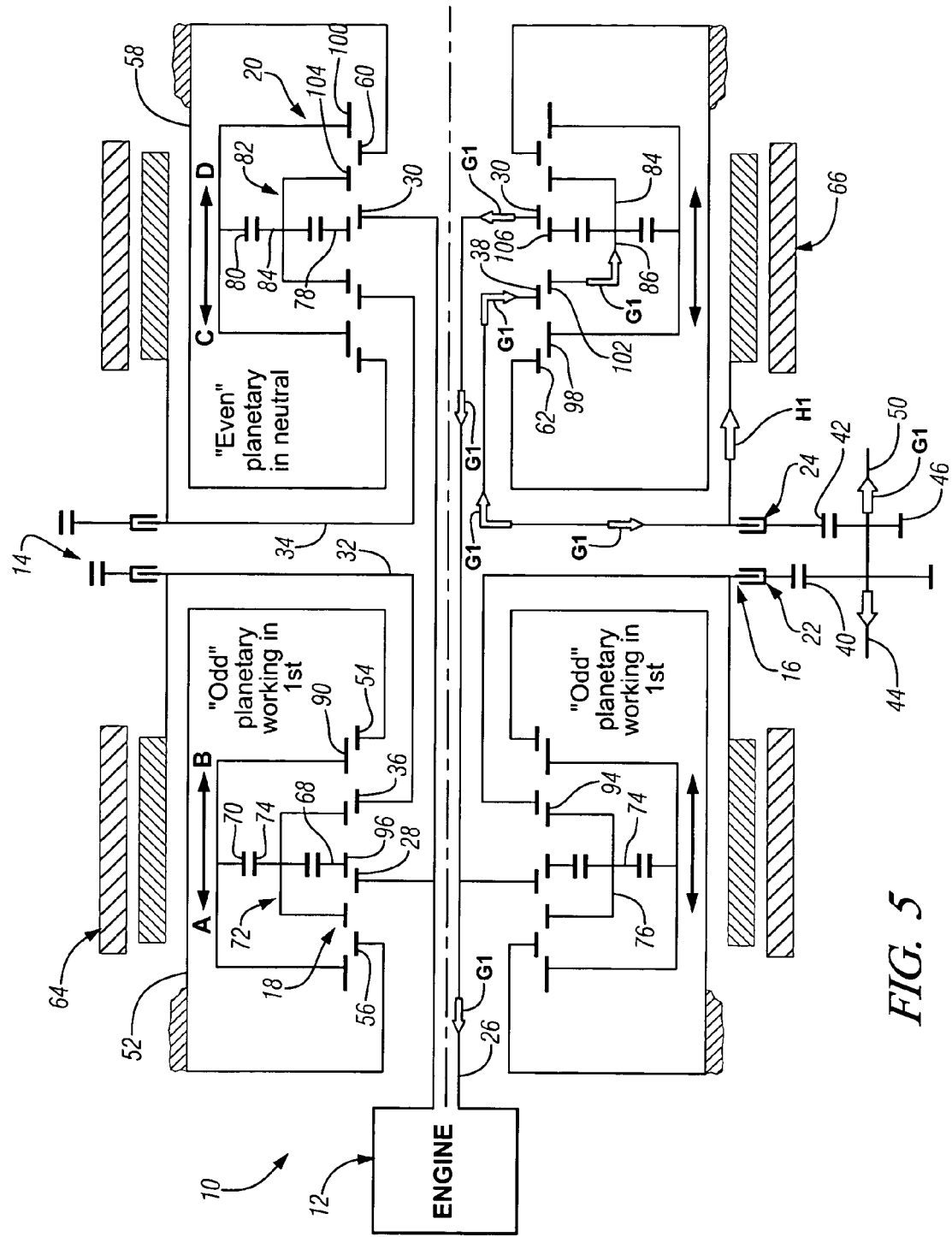
FIG. 5 is a schematic representation of the powertrain similar to that of FIG. 1 wherein the second forward ratio is being employed during deceleration and braking.

The powertrain 10, shown in FIG. 5, is conditioned for second ratio operation. However, the operating condition is for deceleration and braking of the vehicle during second gear. It should be noted that the power flow is from the output shaft through the planetary gearset 20 to the engine 12 to employ the engine for braking, as indicated by Arrows G1. It will be noted by those skilled in the art that this power path is in the opposite direction of the power flow from the engine to the output shaft 50.

Also, the power flow is from the output shaft 50 in the direction of Arrow H1 to the motor/generator 66. The motor/generator 66 is operated as a generator under this condition and the electrical power generated thereby may be used to recharge storage batteries or other electrical accessories of the vehicle.

Figure 6:
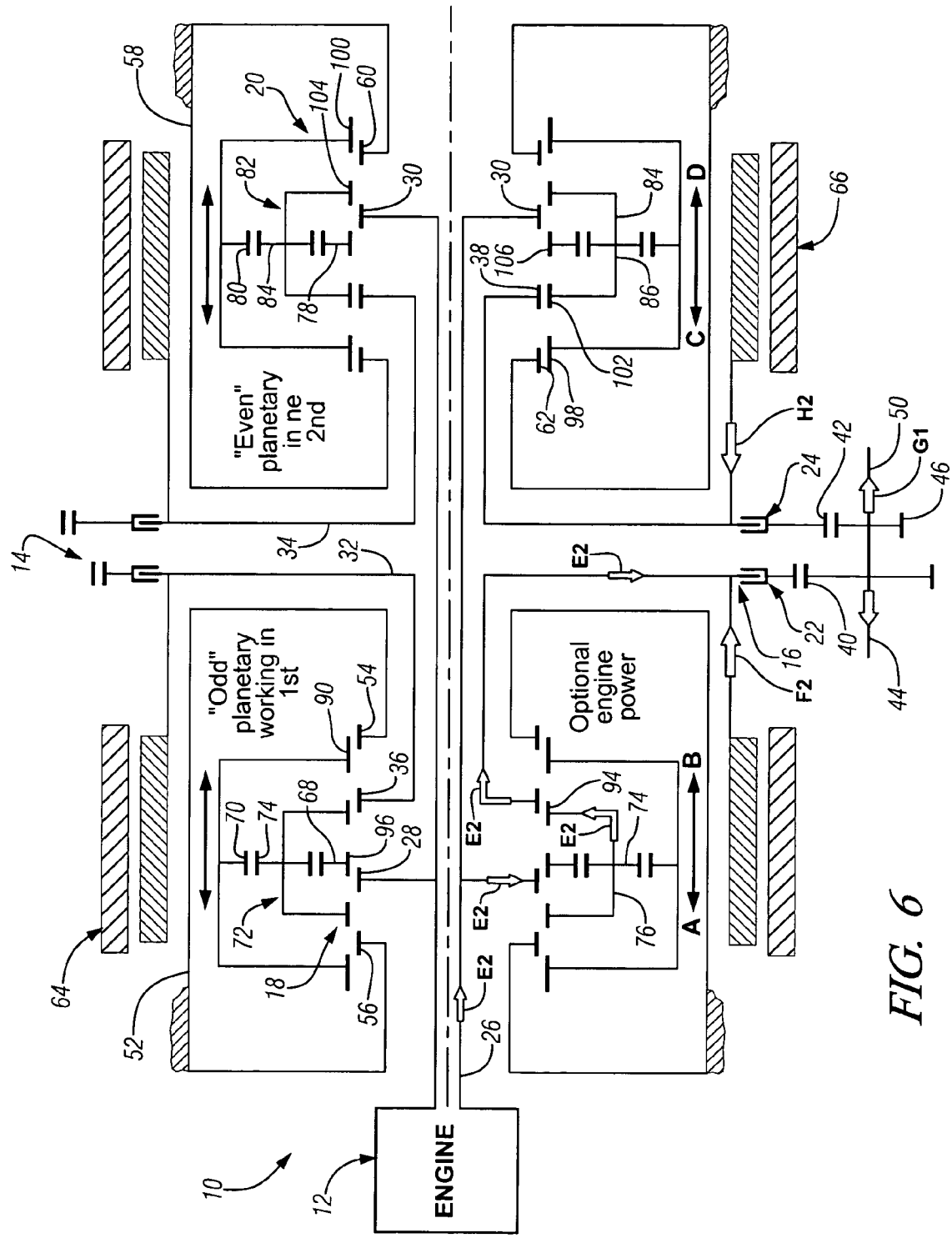
FIG. 6 is a schematic representation of the powertrain similar to that of FIG. 1 wherein the first ratio power flow is assisted by both electric motor/generators.

The powertrain 10, as shown in FIG. 6, is conditioned for the first forward ratio in a manner similar to that shown in FIG. 3. The planetary gearset 18 has been shifted in the direction of Arrow A such that the driving spline combinations are 28–96, 36–94, and 54–90. Thus, the input is to the sun gear member 68 and the output is from the planet carrier member 76. The power flow is shown by Arrows E2.

The difference between the power flow in FIG. 6 and the power flow in FIG. 3 is that additional electrical power assist is provided by the motor/generator 66. This power supply is from the motor/generator 66 in the direction of H2 through the engaged clutch 24 to the output shaft 50 through the gears 42 and 46. The motor/generator 66 is controlled at a speed such that the speed ratio of the gears 42 and 46 is taken into account. That is, it should be recognized that this ratio is different from the gear ratio provided by the gears 40 and 44.

During this power flow condition, the planetary gearset 20 is conditioned for a neutral condition, which is similar to that shown in FIG. 1, wherein the sun gear member 78 is not connected with any of these input, output, or reaction spline members. It should be appreciated that in any speed ratio or drive ratio, the nondriving planetary gearset can be conditioned for neutral, and electrical power assist can be provided to the output shaft 50 from both motor/generator sets 64 and 66.

The fourth forward speed power flow path is through the planetary gearset 20. This power flow path is not shown schematically in the figures; however, those skilled in the art will appreciate that the engagement of spline 100 with spline 30, the engagement of spline 106 with spline 38, and the engagement of the spline 102 with spline 62 will establish this ratio. This presents an underdrive ratio in the planetary gearset 20.

The fifth forward speed ratio is accomplished by engaging the splines 92 and 94 with the splines 28 and 36, respectively. This is a direct drive through the planetary gearset 18. The sixth forward speed ratio is also a direct drive through the planetary gearset 20 by engaging the splines 102 and 104 with the splines 38 and 30, respectively. The difference in speed ratio between the first and second, third and fourth, fifth and sixth, seventh and eighth, and ninth and tenth, is provided by the different gear ratios of the gears 40 and 44 and the gears 42 and 46.

The seventh forward speed ratio is established in the planetary gearset 18 by engaging the spline 36 with the spline 90, engaging the spline 28 with the spline 94, and engaging the spline 96 with the spline 62. This provides input drive at the planet carrier member 76, output drive at the ring gear member 70, and reaction at the sun gear member 68. In the seventh forward speed ratio, the planetary gearset 18 is shifted in the leftmost direction as indicated by Arrow A.

The eighth forward speed ratio is established in the planetary gearset 20 by engaging the spline 106 with the spline 60, engaging the spline 102 with the spline 30, and engaging the spline 98 with the spline 38. This provides input drive at the planet carrier member 86, output drive at the ring gear member 80, and reaction at the sun gear member 78. In this condition, the planetary gearset 20 is shifted in the direction of Arrow D to its furthest position to the right.

The ninth forward speed ratio is established by shifting the planetary gearset 18 back in the direction of Arrow A such that the spline 96 meshes with the spline 36, the spline 92 meshes with the spline 28, and the spline 88 meshes with the spline 56. This provides input drive at the planet carrier member 76, output drive at the sun gear member 68, and reaction at the ring gear member 70.

The tenth forward speed ratio is established in the planetary gearset 20 by engaging the spline 106 to spline 38, engaging the spline 104 to spline 30, and engaging the spline 100 to spline 60. This provides input drive at the planet carrier member 86, output drive at the sun gear member 68, and reaction at the ring gear member 80. To establish this condition, the planetary gearset 20 is shifted in the direction of Arrow C as seen in FIG. 1.

During the interchange of each subsequent ratio, be it an upshift or a downshift, the ratio is preselected in the idling planetary and then the ratio interchange is completed by swapping the clutches 22 and 24 in the manner required. The clutches 22 and 24 are preferably hydraulically operated friction clutches, the construction of which is well known. These are controlled by an electro-hydraulic control system, which might make use of the preprogrammed digital computer used with the electronic control unit. However, other types of clutches, such as electric clutches, or viscous clutches, or magnetorheological fluid clutches can actually be used with powertrain.

The planetary gearset 18 provides all the odd number speed ratios, such as first, third, fifth, seventh, and ninth, while the planetary gearset 20 provides all the even number speed ratios, such as second, fourth, sixth, eighth, and tenth. Therefore, the planetary gearset 18 is quite often termed as the "odd" planetary gearset and the planetary gearset 20 is often termed the "even" planetary gearset.

The operator steps through the ranges in the forward direction by employing the odd and then even planetary gearsets for an upshift from an odd number to an even number, and vice versa if the upshift is from even to odd. This type of shift sequence is known and is generally employed in all dual path type transmissions.

The power assist from both motor/generators 64 and 66 can also be employed in any of the forward or reverse operations by simply placing the nonworking planetary gearset in the neutral condition before engaging its respective clutch.

By way of example, if the sun gear members 68 and 78 each have ninety-one teeth and the ring gear members 70 and 80 each have one hundred and forty-seven teeth, the ring gear/sun gear tooth ratio will be 1.62. Also, if the gear ratio between gears 40 and 44 is selected to be 5.75 and the gear ratio between the gears 42 and 46 is selected to be 4.56, the following gear ratio numbers will be attained.

The reverse ratio of the transmission when using planetary gearset 18 is 9.29 and the reverse ratio through planetary gearset 20 is 7.36. The first gear ratio is 15.04, second gear ratio is 11.92, third gear ratio is 9.31, fourth gear ratio is 7.38, fifth gear ratio is 5.75, sixth gear ratio is 4.56, seventh gear ratio is 3.55, eighth gear ratio is 2.82, ninth gear ratio is 2.20, and tenth gear ratio is 1.74. It should be noted that the steps between adjacent gear ratios is approximately 1.27 at every step.

Obviously, many modifications and variations are possible in light of the above disclosure. Therefore, it should be understood that the invention is only to be limited by the scope of the appended claims.

The invention claimed is:

1. A planetary transmission comprising:
an engine driven input shaft;
an output mechanism including first and second selectively engageable clutches;
a stationary member;
a first planetary gearset having a first gear member, a second gear member, and a third gear member;
first means for selectively interconnecting each of said first, second, and third members of said first planetary gearset with each of said input shaft, said output mechanism, and said stationary member;
a second planetary gearset having a first gear member, a second gear member, and a third gear member;
second means for selectively connecting each of said first, second, and third members of said second planetary gearset with each of said input shaft, said output mechanism, and said stationary member;
said first means and said first clutch being selectively operable to establish five forward speed ratios between said input shaft and said output mechanism;
said second means and said second clutch being selectively operable to establish five forward speed ratios between said input shaft and said output mechanism; and said second means being operable to preselect a forward ratio in the operation of an adjacent forward ratio in said first planetary gearset, and said first means being selectively operable to preselect a forward ratio during the operation of an adjacent forward ratio in said second planetary gearset.

2. The planetary transmission defined in claim 1 further comprising:
   a first motor/generator drivingly connected with said first clutch; and
   a second motor/generator drivingly connected with said second clutch.

3. The planetary transmission defined in claim 2 further wherein said second planetary gearset is also selectively operable to provide a reverse drive ratio.

4. The planetary transmission defined in claim 2 further wherein said output mechanism has an output shaft, a first gear ratio between said first clutch and said output shaft, and a second gear ratio between said second clutch and said output shaft.

5. The planetary transmission defined in claim 2 further wherein said first planetary gearset is also selectively operable to provide a reverse drive ratio.

6. The planetary transmission defined in claim 4 further wherein each of said electric motor/generators is used to facilitate said selective connection of said planetary gearset connected thereto with each of said input shaft, said output mechanism, and said stationary member.

7. A planetary transmission comprising:
   an engine driven input mechanism including first and second selectively engageable clutches;
   an output shaft;
   a stationary member;
   a first planetary gearset having a first member, a second member, and a third member;
   first means for selectively interconnecting each of said first, second, and third members of said first planetary gearset with each of said input mechanism, said output shaft, and said stationary member;
   a second planetary gearset having a first member, a second member, and a third member;
   second means for selectively connecting each of said first, second, and third members of said second planetary gearset with each of said input mechanism, said output shaft, and said stationary member;
   said first means and said first clutch being selectively operable to establish five forward speed ratios between said input mechanism and said output shaft;
   said second means and said second clutch being selectively operable to establish five forward speed ratios between said input mechanism and said output shaft; and
   said second means being operable to preselect a forward ratio in the operation of an adjacent forward ratio in said first planetary gearset, and said first means being selectively operable to preselect a forward ratio during the operation of an adjacent forward ratio in said second planetary gearset.

8. The planetary transmission defined in claim 7 further comprising:
   a first motor/generator drivingly connected with said first clutch; and
   a second motor/generator drivingly connected with said second clutch.

9. The planetary transmission defined in claim 8 further wherein said input mechanism has an input shaft, a first gear ratio between said input shaft and said first clutch, and a second gear ratio between said input shaft and said second clutch.

* * * * *